United States Patent [19]

Wade et al.

[11] Patent Number: 4,481,115

[45] Date of Patent: Nov. 6, 1984

[54] FILTRATION OF SEWAGE SLUDGE

[75] Inventors: David W. Wade, Bradford; Graham G. Dawson, Holmefirth, both of England

[73] Assignee: Allied Colloids Limited, Bradford, England

[21] Appl. No.: 465,380

[22] Filed: Feb. 10, 1983

[30] Foreign Application Priority Data

Feb. 19, 1982 [GB] United Kingdom ................. 8204900

[51] Int. Cl.³ ............................................ C02F 11/14
[52] U.S. Cl. .................................... 210/727; 210/778
[58] Field of Search ................ 210/726, 727, 732–734, 210/778

[56] References Cited

U.S. PATENT DOCUMENTS

| | | | |
|---|---|---|---|
| 3,300,407 | 1/1967 | Priesing et al. | ..................... 210/727 |
| 4,255,258 | 3/1981 | Carr et al. | ....................... 210/778 X |
| 4,332,779 | 6/1982 | Thibodeau et al. | ............ 210/778 X |
| 4,382,864 | 5/1983 | Hashimoto et al. | ................ 210/727 |

*Primary Examiner*—Thomas Wyse
*Attorney, Agent, or Firm*—Lawrence Rosen

[57] ABSTRACT

An organic suspension, such as sewage sludge, is conditioned by adding a conditioner and then filtering the suspension through a filter element to form a filter cake on the element. Improved dryness properties of the cake are obtained by using as conditioner during the formation of at least the first half (by weight solids), but not all, of the cake a high molecular weight polyelectrolyte conditioner and by using as conditioner during the formation of the remainder of the cake an inorganic conditioner or a low molecular weight polyelectrolyte conditioner.

12 Claims, No Drawings

FILTRATION OF SEWAGE SLUDGE

An organic suspension, such as sludge produced during the purification of sewage, is frequently dewatered by filtration on a filter element in order to reduce its volume prior to disposal or to render it autothermic and thus combustible. The filtration is often pressure filtration, in a filter press. In order to assist dewatering the sludge has to be conditioned with chemicals which promote solid-liquid separation and prevent blinding of the filter. Chemicals used for this process include inorganic conditioners such as lime, ferrous sulphate, ferric chloride and aluminium chlorohydrate and also organic water soluble polyelectrolyte conditioners.

Important parameters to the commercial success of the process are the amount of conditioner that has to be used, the final dryness of the cake that is produced by the filtration and the rate of water removal. Routine experimentation is necessary to find the optimum conditioner and filtration conditions for any particular organic suspension. Generally the use of inorganic conditioners produces cakes of satisfactory dryness but may incur two disadvantages. The amount of inorganic conditioner that has to be added may need to be very large, for instance up to 40 or 50% by weight of suspension dry solids, and so the cake is only obtained at the expense of reduced filtration capacity. Also the filtration rate tends to be rather slow, thus reducing the capacity of the plant still further.

Organic high molecular weight water soluble polyelectrolyte conditioners are used in relatively small amounts and give high filtration rates but with many organic suspensions they suffer from the disadvantage that they tend to produce cakes that are not uniformly dried across their surface area. For instance in the case of centre-feed filter presses the cakes may be of adequate dryness around the perimeters but may be rather wet at the centres. It is not clear what causes this effect and various theories have been put forward which suggest that it may be floc breakdown, poor permeability of the formed cake or poor mixing as the velocity of feed falls off towards the end of the pressing cycle.

It has been our object to devise a process for filtering organic suspensions that gives improved dryness of the filter cake without unacceptable reduction in the speed of filtration.

In the invention an organic suspension is conditioned by adding conditioner and is then filtered through a filter element to form a filter cake on the element and during the formation of at least the first half (by weight solids) of the cake the suspension is conditioned with high molecular weight polyelectrolyte conditioner and during the formation of the remainder of the cake the suspension is conditioned with an inorganic conditioner or a low molecular weight polyelectrolyte conditioner.

The filtration must be effected by a method in which it is possible to alter, during the filtration, the conditioner that is added to the suspension. The filtration is normally carried out by pressure filtration and preferably the filtration is a batchwise process conducted in such a manner that the conditioner can be altered during each batch. Preferably the filtration is conducted in a filter press in which the element separates a filter chamber, to which the suspension is fed through an inlet, from a filtrate outlet. In practice the filter press normally consists of a series of shallow filter chambers defined on one or both sides by a filter cloth or other filter element and the organic suspension is fed to each chamber, often centrally, and filtrate is removed from the press, generally at the side when the suspension feed to the chamber is central. Filtration is generally conducted until the chambers are all substantially full of dry cake, whereupon filtration is stopped and the dry cake is removed. Conveniently the suspension is conditioned with the high molecular weight polyelectrolyte conditioner during a first part of the cycle operated at a pressure of up to 2 to 6 bar and the suspension is conditioned using the low molecular weight polyelectrolyte or the inorganic conditioner during the remainder of the cycle which is operated at a higher pressure, generally up to a pressure of 4 to 10 bar. Sometimes the pump used for the second part of the cycle is different from the pump used for the first part of the cycle. Generally the high molecular weight polyelectrolyte conditioner is used during the formation of from 60 to 90% by weight of the cake. It may be possible to form a minor amount of the cake without addition of any conditioner.

The high molecular weight polyelectrolyte can be any high molecular weight water soluble polyelectrolyte that is suitable for conditioning the organic suspension prior to filtration and will generally be a material that can be classed as a flocculant. It will normally be cationic. Its molecular weight is normally above 100,000, generally 500,000 to 30,000,000. Preferred materials are cationic polyacrylamides and polyacrylates and in particular polymers that include units of dialkylaminoalkyl(meth) acrylamide or dialkylaminoalkyl(meth) acrylate, with preferred materials being Mannich reaction products of polyacrylamide, for instance dialkylaminomethyl polyacrylamide wherein the alkyl groups are methyl or ethyl. The quaternary versions of these polymers are preferred, for instance the derivatives with methyl halide or dimethyl sulphate. Another suitable flocculant is diallyldimethyl ammonium chloride acrylamide copolymer.

The inorganic conditioner may be any of the inorganic materials which are known to be useful as coagulants and to be useful for conditioning organic suspensions prior to filtration. They include inorganic salts of polyvalent metals, for instance derivatives of aluminium, calcium and iron. Aluminium salts are preferred. Suitable low molecular weight polyelectrolytes are water soluble cationic polymers which are known as coagulants and which are suitable for conditioning organic suspensions prior to filtration. Their molecular weight is generally below 100,000 typically 20,000 to 80,000. They may be formed of the same monomers as those discussed above for the high molecular weight flocculants. Another suitable polyelectrolyte is the low molecular weight condensation product of epichlorhydrin with an amine.

Conditioning is effected by adding the appropriate amount of the flocculant during the first stage of the filtration and then the appropriate amount of coagulant. The amounts may be those commonly used for conditioning organic suspensions prior to filtration. Thus the amount of high molecular weight flocculant may be 0.1 to 3%. The amount of inorganic coagulant may be 0.5 to 50%, preferably 1 to 10% by weight. The amount of low molecular weight polyelectrolyte coagulant may be 0.1 to 5% by weight. These percentages are by weight based on the weight of dry solids in the suspension to which the additions are made.

The organic suspension that is filtered in the invention may be selected from a wide variety of organic suspensions but preferably is sewage sludge. The suspension may be derived from raw and/or processed sewage after the sedimentation stage. The solids in the suspension may have been subjected to a biological aerobic or anaerobic digestion stage to product a digested sludge.

The invention avoids the disadvantages of using inorganic coagulant as the sole conditioner (slow filtration rate and high added coagulant amount based on the weight of the cake) while providing very satisfactory and uniform dryness with a wide range of organic suspensions. We find it is possible to obtain cakes that are drier than are conveniently obtainable using the flocculant or coagulant conditioners alone in an otherwise identical process.

A particular advantage of the invention is that it leads reliably to more uniform dryness throughout the cake than is generally obtainable when high molecular weight polyelectrolyte flocculant is used as the sole conditioner. Thus although some suspensions will give an adequately uniform dryness many organic suspensions give a cake that is substantially wetter at the position of the inlet to the chamber than at the positions distant from the inlet when they are conditioned prior to filtration solely by a high molecular weight polyelectrolyte flocculant. Thus the invention has the advantage that it permits uniform dryness of cakes obtained from such suspensions and so provides a process that is capable of giving uniform, and high, cake dryness for a variety of organic suspensions. Broadly, in the invention we maintain the advantages of fast dewatering and high solids capacity obtainable from the use of flocculant conditioning, without the variable dryness that generally follows from that, and we also obtain uniform dewatering, as is obtained with coagulant conditioning, without the slow filtration that is associated with that. Briefly, we obtain the advantages of both flocculant and coagulant conditioning while avoiding the disadvantages of both. Additionally, as mentioned, we can obtain increased dryness throughout the cake.

The following are examples of the invention. Examples 1 and 2 were carried out using plate-type filter presses in which the filter elements are formed of synthetic woven filter fabric. Each press plate had a centre aperture to allow sludge to be fed into the press. The dry solids weight of the resultant press filter cake was recorded at 3 positions. The inner position was the centre of the cake, adjacent the inlet to the filter chamber. The outer position was the edge of the cake, distant from the inlet.

The middle position was approximately mid-way between the inner and outer positions.

EXAMPLE 1

Digested sludge having a dry solids content of 4.31% w/w was dewatered on 4 filter presses in which the recess formed between adjacent plates, which defined the filter chamber and determined the thickness of the cakes, was 3 cms deep. The filling and initial dewatering stage of each pressing cycle, up to the time when at least half the final weight of the filter cake had been collected, was conducted using an eccentric rotor pump giving a pressure of up to 4 bar and the conditioner was fed directly to the outlet of this pump. The remainder of the cycle was conducted using a positive displacement piston pump giving a pressure up to 7 bar and the conditioner was fed via an automatic dosing device, as described in British Patent Specification No. 1,509,969, to the inlet of the piston pump. 4 different conditioning treatments were used as follows:

(a) Aluminium chlorohydrate at a dose of 3.5% $Al_2O_3$ on dry solids for a total pressing time of six hours.
(b) A high molecular weight cationic polyelectrolyte, at 1.4% polymer on dry solids for a total pressing time of six hours. The cationic polyelectrolyte was a quaternised dimethylaminomethyl polyacrylamide having a molecular weight about 1,000,000.
(c) As (b) but for a total pressing time of 5 hours.
(d) The cationic polyelectrolyte of (b) at 1.4% polymer on dry solids for four hours, whilst dosing after the eccentric rotor pump, followed by aluminium chlorohydrate dosing at 3.5% $Al_2O_3$ for one hour. Results are shown in Table 1.

TABLE 1

| Treatment | Presscale Dry Solids % | | |
|---|---|---|---|
| | Inner | Middle | Outer |
| a | 31.66 | 33.92 | 32.13 |
| b | 24.01 | 21.45 | 34.41 |
| c | 21.04 | 25.80 | 34.34 |
| d | 34.88 | 34.55 | 33.67 |

It can be seen that the polyelectrolyte alone gave low dry solids at the inner and middle positions, compared to the inorganic coagulant (a) but that the combination of the invention (d) gave substantially uniform solids content across the cake and a dryness that was greater than was obtained in tests (a), (b) or (c).

EXAMPLE 2

At a sewage sludge disposal works a full line of filter presses was used to filter sewage sludge containing 4.23% dry solids. The first part of the filtration cycle lasted 1.5 hours and was conducted using a Mono pump giving a maximum pressure of 4 bars. The final part of the cycle lasted 4.5 hours and was conducted using a Willett pump giving a maximum pressure of 7 bars.

In test A a quaternised dimethylaminomethyl polyacrylamide flocculant was dosed at 0.86% active polymer by weight on dry solids into the Mono pump and aluminium chlorohydrate was dosed at 4.2% $Al_2O_3$ by weight on dry solids into the Willett pump. In another test, B, the flocculant was dosed into both pumps at 0.86% based on dry solids. In another test, test C, the aluminium chlorohydrate was dosed at 4.2% $Al_2O_3$ by weight on dry solids. The dry solids content of two filter cakes was determined in each test at inner, middle and outer positions. The results are given in Table 2.

TABLE 2

| Test | Press Cake Dry Solids % | | |
|---|---|---|---|
| | Inner | Middle | Outer |
| A | 34.09 | 34.09 | 34.51 |
| | 35.54 | 34.36 | 36.36 |
| B | 27.85 | 27.19 | 31.18 |
| | 27.04 | 28.01 | 29.97 |
| C | 31.66 | 32.97 | 32.46 |
| | 26.78 | 32.26 | 33.00 |

It can be seen that in addition to a more uniform solids content, a better overall dewatering was obtained using the combination of polyelectrolyte and inorganic coagulant.

EXAMPLE 3

A sewage sludge feed with about 4% solids was conditioned and pressed at low pressure (4 bar) for 15 minutes and then at high pressure (7 bar) for 45 minutes using a pilot scale plate and frame press having a corner inlet feed and a filtrate outlet adjacent the opposite corner of each chamber. During the first 15 minutes the same polyelectrolyte was added as in example 1 at a rate of 0.73% by weight active product based on dry solids.

During the remaining 45 minutes coagulant was used as conditioner. When the coagulant was aluminium chlorohydrate it was dosed at 2.73% $Al_2O_3$ by weight dry solids and the dry solids content of the cake was 34.8% (adjacent the inlet) and 36.0% (distant the inlet).

When the coagulant was a low molecular weight epichlorhydrin amine condensation polymer it was dosed at 0.73% by weight active polymer based on dry solids and the dry solids content of the cake was 33.1% (adjacent the inlet) and 32.7% (distant the inlet). This shows that satisfactory uniformity is obtained when low molecular weight polyelectrolyte coagulant is used instead of inorganic coagulant.

We claim:

1. A process in which an aqueous suspension of organic solid material is conditioned by adding a water soluble conditioner and then filtering the suspension through a filter press to form a filter cake and in which during the formation of at least the first half (by weight solids), but not all, of the cake the conditioner is a water soluble high molecular weight polyelectrolyte conditioner having a molecular weight above 100,000 and during the formation of the remainder of the cake the conditioner is an inorganic conditioner or a low molecular weight polyelectrolyte conditioner having a molecular weight below 80,000.

2. A process according to claim 1 using a filter press in which the element separates a filter chamber, to which the suspension is fed through an inlet, from a filtrate outlet and in which the cake is of substantially uniform dryness and the suspension is one that, when conditioned throughout the filtration only by the high molecular weight polyelectrolyte, gives a cake that is subtantially wetter at the position of the inlet to the chamber than at positions distant from the filtrate inlet.

3. A process according to claim 1 in which the suspension is a sewage sludge.

4. A process according to claim 1 in which the high molecular weight polyelectrolyte is used as the conditioner during the formation of the first 60 to 90% by weight of the cake and the inorganic or low molecular weight polyelectrolyte conditioner is used for the formation of the remainder of the cake.

5. A process according to claim 1 in which the high molecular weight polyelectrolyte is a water soluble cationic polymeric flocculant having a molecular weight above 100,000.

6. A process according to claim 1 in which the high molecular weight polyelectrolyte is selected from optionally quaternised dialkylaminoalkyl(meth) acrylamide polymers and copolymers, optionally quaternised dialkylaminoalkyl(meth) acrylate polymers and copolymers and diallyl dimethyl ammonium chloride-acrylamide copolymers.

7. A process according to claim 1 in which the high molecular weight polyelectrolyte is a quaternised dialkylaminomethyl polyacrylamide.

8. A process according to claim 1 in which an inorganic conditioner is used and is selected from salts of aluminium, calcium and iron.

9. A process according to claim 1 in which a low molecular weight polyelectrolyte conditioner is used and is a water soluble cationic polymer coagulant having a molecular weight less than 80,000.

10. A process according to claim 1 in which a low molecular weight polyelectrolyte conditioner is used and is a water soluble cationic polymer coagulant having a molecular weight less then 80,000 and selected from optionally quaternised dialkylaminoalkyl(meth) acrylamide polymers and copolymers, optionally quaternised dialkylaminoalkyl(meth)acrylate polymers and copolymers and epichlohydrin-amine condensates.

11. A process according to claim 1 wherein the high molecular weight polyelectrolyte conditioner is selected from the group consisting of cationic polyacrylamides and cationic polyacrylates, and wherein the conditioner used during formation of the remainder of the cake is selected from the group consisting of inorganic salts of polyvalent metals and low molecular weight epichlorhydrin amine condensation polymers.

12. In a method of producing a filter cake by conditioning an aqueous suspension of organic solid material using a high molecular weight polyelectrolyte and then filtering the suspension under pressure through a filter press to form the cake and in which the cake is of non-uniform dryness across the area of the element, the improvement comprising using a water soluble high molecular weight polyelectrolyte having a molecular weight above 100,000 as conditioner during the formation of at least the first half (by weight solids), but not all, of the cake and using as conditioner during the formation of the remainder of the cake an inorganic conditioner or a low molecular weight polyelectrolyte conditioner having a molecular weight below 80,000, and thereby obtaining a cake having a dryness which is more uniform across the area of the element.

* * * * *